(12) United States Patent
Passint

(10) Patent No.: US 7,765,454 B2
(45) Date of Patent: Jul. 27, 2010

(54) FAULT TOLERANT MEMORY SYSTEM

(75) Inventor: Randal S. Passint, Chippewa Falls, WI (US)

(73) Assignee: SGI International, Inc., Fremont, CA (US)

( * ) Notice: Subject to any disclaimer, the term of this patent is extended or adjusted under 35 U.S.C. 154(b) by 811 days.

(21) Appl. No.: 11/136,260

(22) Filed: May 24, 2005

(65) Prior Publication Data

US 2006/0282751 A1   Dec. 14, 2006

(51) Int. Cl.
*G11C 29/00* (2006.01)
(52) U.S. Cl. .................................. 714/763; 714/758
(58) Field of Classification Search ................ 714/763, 714/758
See application file for complete search history.

(56) References Cited

U.S. PATENT DOCUMENTS 5,490,155 A * 2/1996 Abdoo et al. ............... 714/763
5,923,680 A * 7/1999 Brueckheimer et al. ..... 714/758
6,560,148 B2 * 5/2003 Takami et al. .............. 365/190
7,246,300 B1 * 7/2007 Au et al. ..................... 714/758

OTHER PUBLICATIONS

Kaneda, Shigeo, *Single Byte Error Correcting-Double Byte Error Detecting Codes for Memory Systems*, IEEE Transactions on Computers, vol. C-31, No. 7, Jul. 1982, 7 pages.

* cited by examiner

*Primary Examiner*—Sam Rizk
(74) *Attorney, Agent, or Firm*—Sunstein Kann Murphy & Timbers LLP

(57) ABSTRACT

A method and apparatus for managing X4 or larger types of memory first receives a data word to be stored in the memory, and then generates a check datum, which is a function of the data word and a set of encode data. After storing the data word in memory, the method and apparatus use the check datum and the data word to generate a syndrome. The method and apparatus then determine if the data word in the memory is correct as a function of the syndrome.

27 Claims, 7 Drawing Sheets

FAULT TOLERANT MEMORY SYSTEM

FIELD OF THE INVENTION

The invention generally relates to memory systems and, more particularly, the invention relates to fault tolerance and error correctable memory systems.

BACKGROUND OF THE INVENTION

Computer systems generally require robust and reliable data storage. For example, some multiprocessor computer systems may have up to 10,000 dual in-line memory modules (DIMMs) for executing a complex task in real-time. A failure rate of one percent per day therefore could cause hundreds of consequential errors per day. Such an error rate is unacceptable for many applications The art responded to this problem by developing memory that can be corrected during run time. One such widely used type of memory is known as "error checking and correcting memory" ("ECC memory"). Specifically, ECC memory implements algorithms that detect and correct memory errors by generating and processing specialized correction bits. For example, the well-known SECDED (single error correcting, double error detecting) algorithm generally is capable of correcting one bit errors, and detecting (but not correcting) two bit errors.

The single bit error correcting algorithms often provide sufficient results when used with "X1-type" memory chips (i.e., arrays of memory chips that each store one bit of a data word). Many current systems, however, use "X4-type" memory chips (i.e., arrays of memory chips that each store four bits of a data word). Accordingly, failure of a single X4-type memory chip can corrupt four bits of a single data word and thus, cannot be corrected by the SECDED algorithm. This deficiency is even more acute in computer systems having memory chips that store more than four bits of a data word.

SUMMARY OF THE INVENTION

In accordance with one aspect of the invention, a method and apparatus for managing X4 or larger types of memory first receives a data word to be stored in the memory, and then generates a check datum, which is a function of the data word and a set of encode data. After storing the data word in memory, the method and apparatus use the check datum and the data word to generate a syndrome. The method and apparatus then determine if the data word in the memory is correct as a function of the syndrome.

The method and apparatus also may store the check datum in memory. Moreover, the check datum may be generated by applying a function to selected bits of the data word. Those selected bits may be selected as determined by the set of encode data. Among other things, the set of encode data may include a table identifying bits of the data word to be processed. In addition, the check datum may generate the syndrome by appending the check datum with the data word to produce revised data, and applying a logical function to selected bits of the revised data to produce the syndrome. The selected bits that are selected as determined by the set of encode data to produce the syndrome.

In some embodiments, the method and apparatus may determine if the data word in memory is correct by comparing the syndrome to a set of error identity data, and correcting the error if the syndrome matches at least one datum in the set of error identity data. Such embodiments may correct between one and four bits of data. The set of error identity data may be generated from the set of encode data, where the set of error identity data has a plurality of values assigned to each bit of the data word. The error of a given bit thus is corrected if the syndrome matches at least one of the plurality of values assigned to the given bit.

The method and apparatus also may determine that a given bit of the data word has an error. In some such cases, the given bit may be reread to determine if the error has been corrected. In addition to (or in the alternative), the method and apparatus also may store the data word in a mirror memory location and, if the given bit is determined to have the error after it is re-read, retrieve the correct data for the given bit from the mirror memory location. Such corrected data then may be stored in the given bit. The method and apparatus also may correct other bit errors in the data word if the given bit is corrected.

In accordance with another aspect of the invention, an apparatus for managing X4 or larger types of memory has an input for receiving a data word to be stored in the memory, and an encoder operatively coupled with the input. The encoder generates a check datum as a function of both 1) the data word to be stored and 2) a set of encode data. The apparatus also has a data handler for storing the data word in the memory, a decoder that uses the check datum and the data word to generate a syndrome, and an error module for determining if the data word in the memory is correct as a function of the syndrome.

Illustrative embodiments of the invention are implemented errors a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Illustrative embodiments of the invention are capable of correcting and/or detecting multi-bit errors in X4-types of memory. Details of various embodiments are discussed below.

Figure 1:
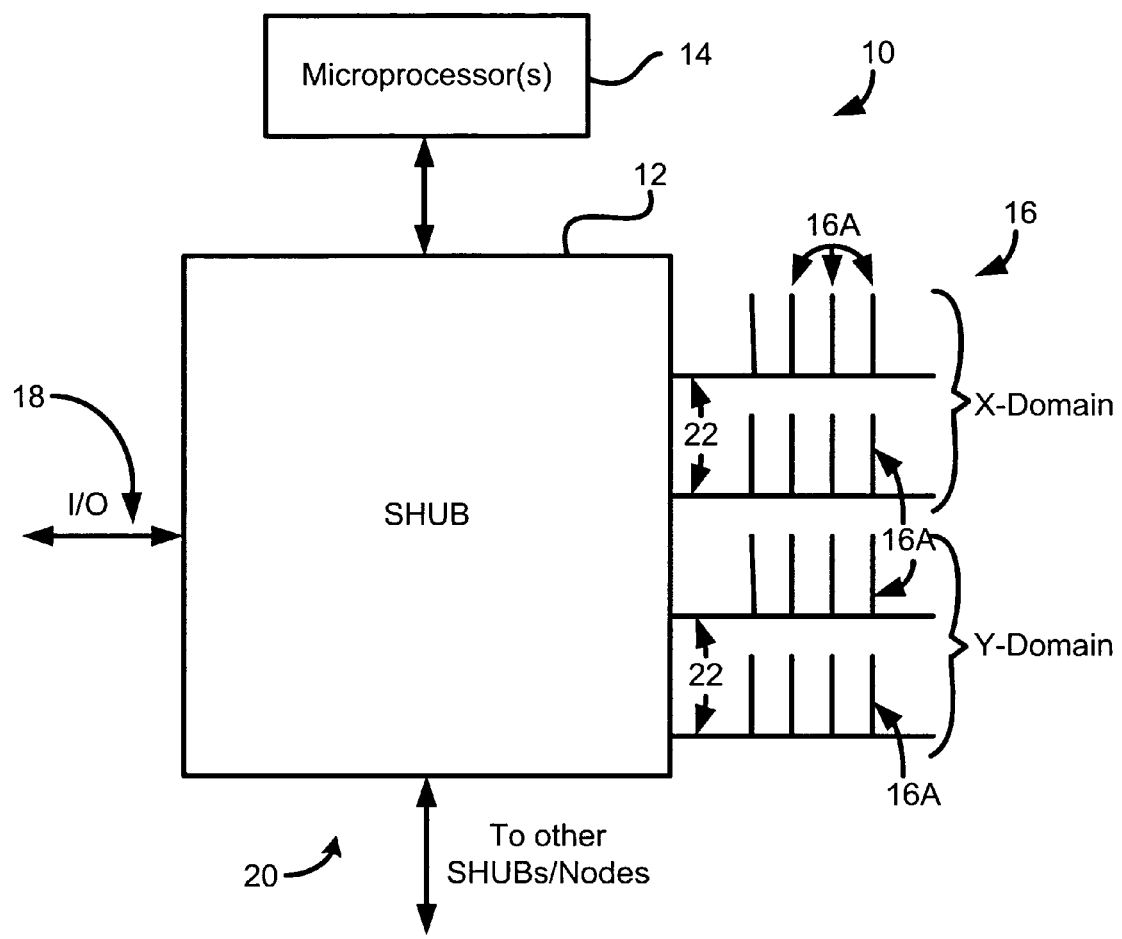
FIG. 1 schematically shows a node of a multiprocessor computer system that can be configured in accordance with illustrative embodiments of the invention.

FIG. 1 schematically shows a node 10 of a multiprocessor computer system that can be configured in accordance with illustrative embodiments of the invention. Specifically, the node 10 has a plurality of components coordinated by an SHUB chip 12. In illustrative embodiments, the SHUB chip 12 is a gate array chip customized to perform a number of functions, including those discussed below with regard to FIGS. 4A and 4B. The SHUB chip 12 also may include a microprocessor instead of, or in addition to, the gate arrays.

The components coupled with the SHUB chip 12 include one or more microprocessors 14 for generating data words (among other things), memory 16 for storing the data words, and an I/O interface 18 for communicating with devices that are external to the computer system. In addition, the components also include a link 20 to other nodes in the computer system.

In illustrative embodiments, the microprocessors 14 include two 4X-ITANIUM microprocessors (distributed by Intel Corporation of Santa Clara, Calif.) that generate 128 bit words for storage in a plurality of dual in-line memory modules ("DIMMs 16A"). The DIMMs 16A illustratively have X4-type random access memory chips (e.g., DRAM chips) for storing data generated by the microprocessors 14. As an example, FIG. 1 shows four sets of DIMMs 16A that each are coupled to respective 72 bit buses 22. Accordingly, the SHUB chip 12 may transfer 72 bits of data across each bus 22 per clock cycle. Sixty-four of those bits may include data from the 128 bit data word, while an additional eight bits may include data from a 16-bit checksum value (discussed below). Moreover, the buses 22 illustratively operate independently and transmit data in a synchronized manner.

The first pair of buses 22 and their coupled DIMMs 16A are considered to form a first domain (the X-domain), while the second pair of buses 22 and their coupled DIMMs 16A are considered to form a second domain (the Y-domain). Because the DIMMs have X4-type random access memory (e.g., 18 DRAMs that each store 72 bits), every four bits of a data word are stored in a round-robin fashion on alternating DRAMs. For example, the first four bits of a word are stored on the first DRAM of a stripe, the second four bits of a word are stored on the second DRAM of that stripe, the third four bits of the word are stored on the first DRAM of that stripe, etc. . . . .

Figure 2:
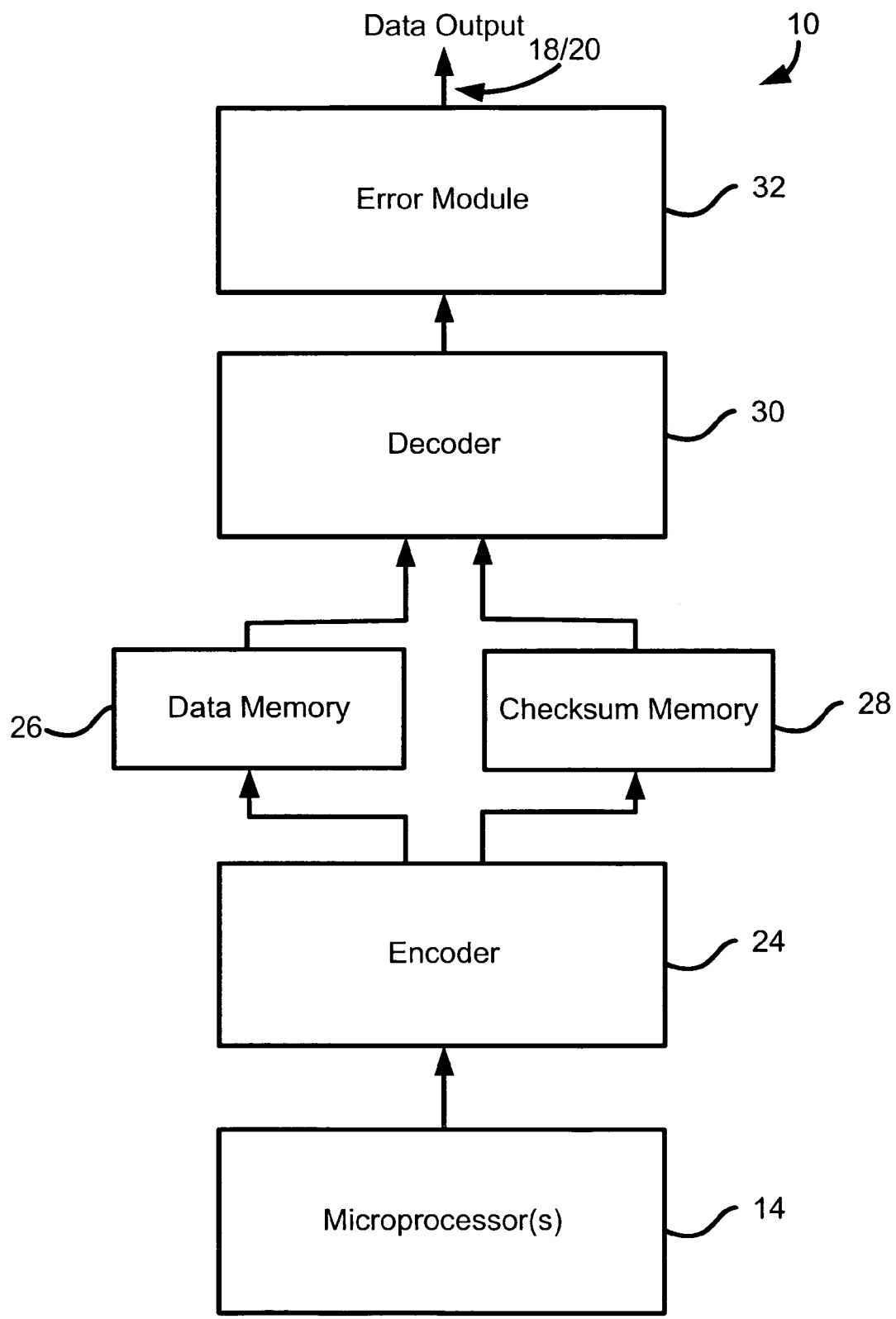
FIG. 2 schematically shows a logical layout of the node shown in FIG. 1 in accordance with illustrative embodiments of the invention.

FIG. 2 schematically shows a logical layout of the node 10 shown in FIG. 1. In particular, FIG. 2 shows the microprocessor(s) 14 coupled with an encoder 24. After passing the 128 bit data word to data memory 26 (i.e., within a DIMM 16A), the encoder 24 generates a 16-bit checksum value, which is stored in checksum memory 28 (also within a DIMM 16A). A decoder 30 receives both the 128 bit data word and checksum, and generates a syndrome for use by an error module 32 in detecting and/or correcting memory errors. If the 128 bit data word is either confirmed to be accurate or corrected, it may be forwarded to some other component through one of the data output 18 or 20.

Figure 3:
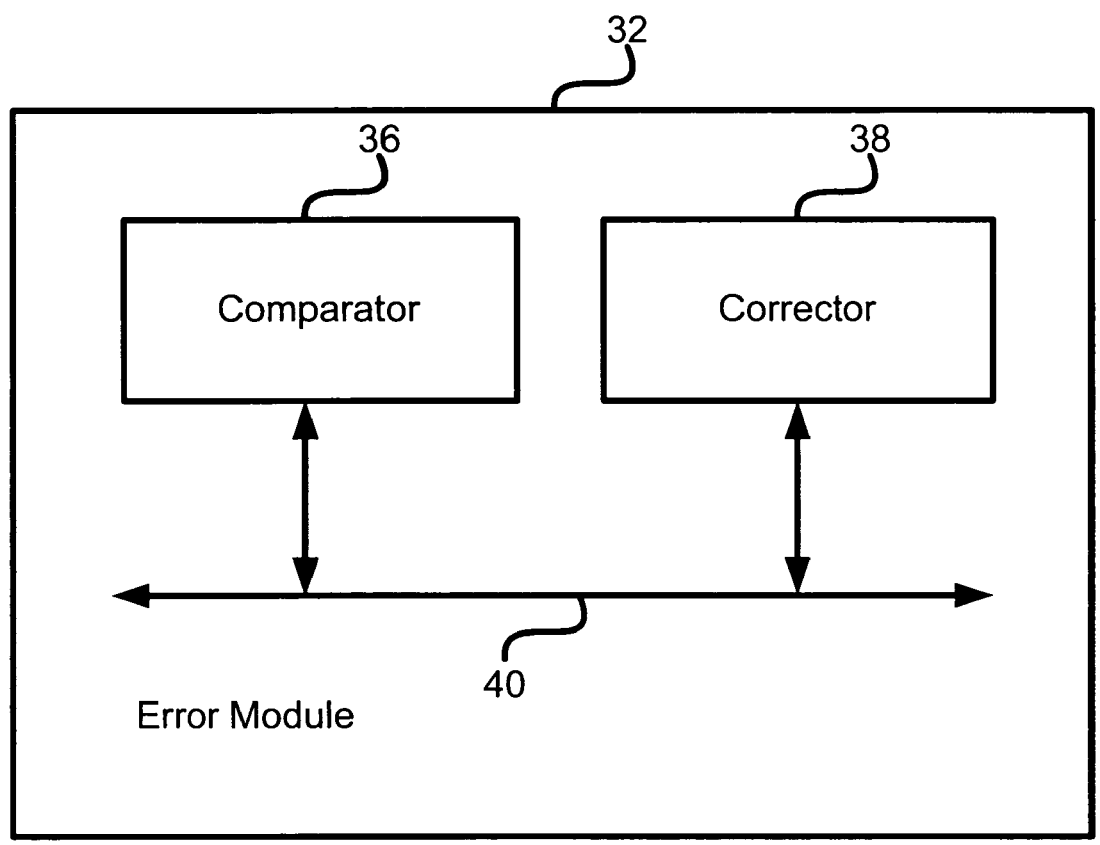
FIG. 3 schematically shows additional details of an error module shown in FIG. 2.

FIG. 3 schematically shows additional details of the error module 32, which includes a comparator 36 for comparing syndrome values, and a corrector 38 for correcting memory errors. The comparator 36 and corrector 38 communicate via a common bus 40.

It should be noted that various embodiments of the invention are not limited to the architecture shown in FIGS. 1-3. Other architectures implementing similar functionality therefore may be used. In addition, the architecture shown in FIGS. 1-3 may include additional functional modules, or be combined into fewer functional modules to perform similar processes. Discussion of the architecture shown in FIGS. 1-3 therefore is exemplary and not intended to limit all embodiments.

Figure 4A:
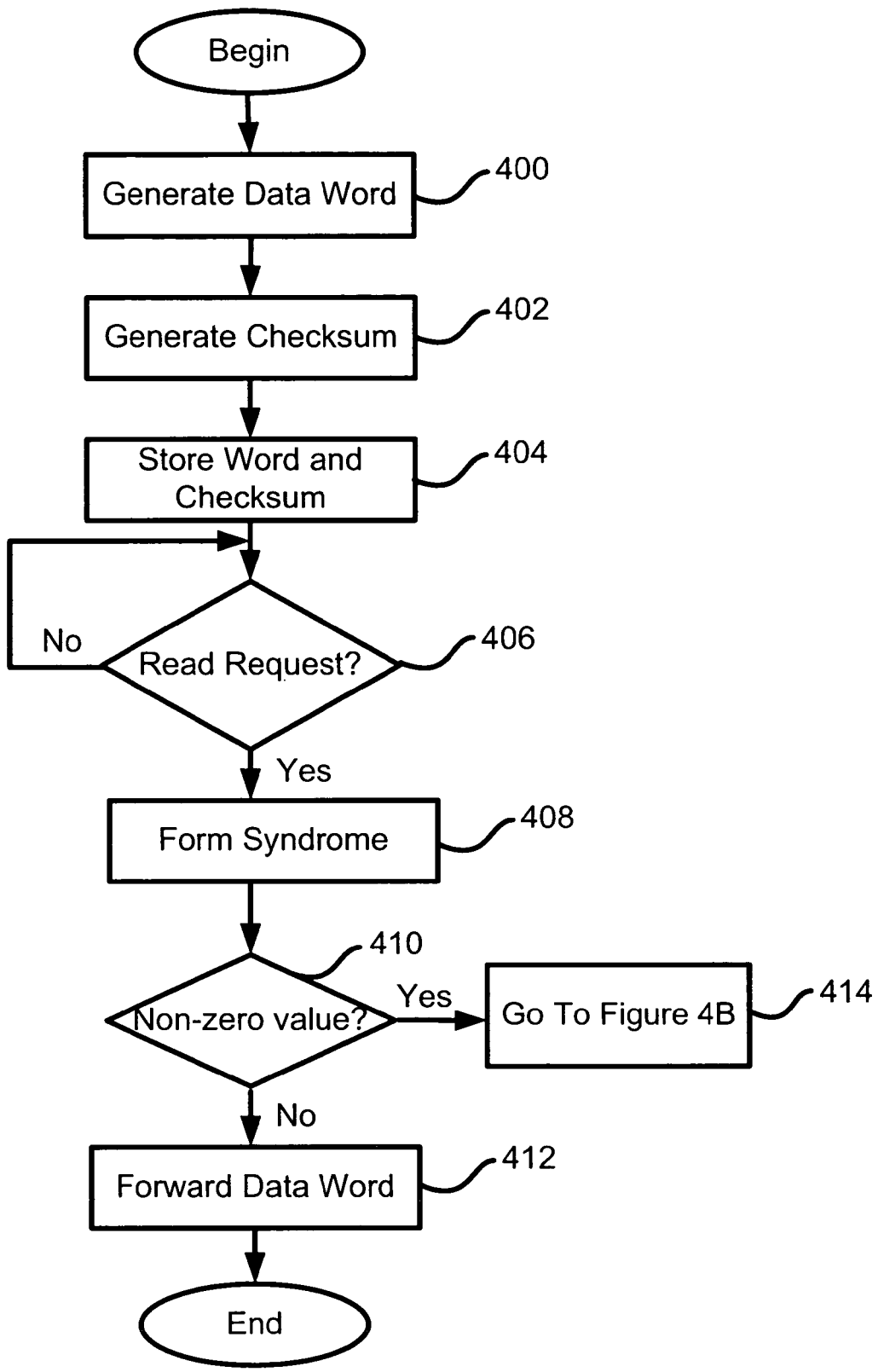
FIG. 4A shows a process of managing memory in accordance with illustrative embodiments of the invention.

FIG. 4A shows a process of detecting and/or correcting memory errors in accordance with illustrative embodiments of the invention. Although the process is described for storing a single 128 bit data word, those in the art should understand that such a process repeats for each data word to be stored. The process begins at step 400 when the microprocessor 14 generates a 128 bit data word for storage in the DIMMs 16A. This 128 bit word is referred to herein as the "store word." Before the store word is stored (e.g., by some data handler), however, the encoder 24 generates a 16 bit checksum value for storage in the checksum memory 28 (step 402).

The encoder 24 illustratively accesses a pre-generated encode table to generate the 16-bit checksum value. As an example, Table 1 below shows an encode table that may be used with various embodiments.

TABLE 1

| | 35 | 34 | 33 | 32 | 31 | 30 | 29 | 28 | 27 | 26 | 25 | 24 | 23 | 22 | 21 | 20 | 19 | 18 |
|---|---|---|---|---|---|---|---|---|---|---|---|---|---|---|---|---|---|---|
| s15 | 1... | .... | .... | .... | 1... | 1... | 1... | 1... | 1... | 1... | 1... | 1... | .... | .... | .... | .... | .... | .... |
| s14 | .1.. | .... | .... | .... | .1.. | .1.. | .1.. | .1.. | .1.. | .1.. | .1.. | .1.. | .... | .... | .... | .... | .... | .... |
| s13 | ..1. | .... | .... | .... | ..1. | ..1. | ..1. | ..1. | ..1. | ..1. | ..1. | ..1. | .... | .... | .... | .... | .... | .... |
| s12 | ...1 | .... | .... | .... | ...1 | ...1 | ...1 | ...1 | ...1 | ...1 | ...1 | ...1 | .... | .... | .... | .... | .... | .... |
| s11 | .... | 1... | .... | .... | .111 | 1111 | 111. | 11.. | 1... | ...1 | ..1. | .1.. | 1... | 1... | 1... | 1... | 1... | 1... |
| s10 | .... | .1.. | .... | .... | 11.. | 1... | .... | .... | .1.. | 1..1 | .11 | .11. | .1.. | .1.. | .1.. | .1.. | .1.. | .1.. |
| s09 | .... | ..1. | .... | .... | 111. | 11.. | 1... | ...1 | ..1. | .1.. | 1..1 | ..11 | ..1. | ..1. | ..1. | ..1. | ..1. | ..1. |
| s08 | .... | ...1 | .... | .... | 1111 | 111. | 11.. | 1... | ...1 | ..1. | .1.. | 1..1 | ...1 | ...1 | ...1 | ...1 | ...1 | ...1 |
| s07 | .... | .... | 1... | .... | .1.. | ..1. | ...1 | 1... | 11.. | 111. | 1111 | .111 | .111 | 1111 | 111. | 11.. | 1... | ...1 |
| s06 | .... | .... | .1.. | .... | .11. | ..11 | 1..1 | .1.. | ..1. | 1... | 11.. | 11.. | 11.. | ...1 | ..1. | ..1. | .1.. | 1..1 |
| s05 | .... | .... | ..1. | .... | ..11 | 1..1 | .1.. | ..1. | ...1 | 1... | 11.. | 111. | 111. | 11.. | 1... | ...1 | ..1. | .1.. |
| s04 | .... | .... | ...1 | .... | 1..1 | .1.. | ..1. | ...1 | 1... | 11.. | 111. | 1111 | 1111 | 111. | 11.. | 1... | ...1 | ..1. |
| s03 | .... | .... | .... | 1... | .... | .... | .... | .... | .... | .... | .... | .... | .1.. | ..1. | ...1 | 1... | 11.. | 111. |
| s02 | .... | .... | .... | .1.. | .... | .... | .... | .... | .... | .... | .... | .... | .11. | ..11 | 1..1 | .1.. | ..1. | ...1 |
| s01 | .... | .... | .... | ..1. | .... | .... | .... | .... | .... | .... | .... | .... | ..11 | 1..1 | .1.. | ..1. | ...1 | 1... |
| s00 | .... | .... | .... | ...1 | .... | .... | .... | .... | .... | .... | .... | .... | 1..1 | .1.. | ..1. | ...1 | 1... | 11.. |

| | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| s15 | .... | .... | .1.. | ..1. | ...1 | 1... | 11.. | 111. | 1111 | .111 | .111 | 1111 | 111. | 11.. | 1... | ...1 | ..1. | .1.. |
| s14 | .... | .... | .11. | ..11 | 1..1 | .1.. | ..1. | ...1 | 1... | 11.. | 11.. | 1... | ...1 | ..1. | .1.. | 1..1 | ..11 | .11. |
| s13 | .... | .... | ..11 | 1..1 | .1.. | ..1. | ...1 | 1... | 11.. | 111. | 111. | 11.. | 1... | ...1 | ..1. | .1.. | 1..1 | ..11 |
| s12 | .... | .... | 1..1 | .1.. | ..1. | ...1 | 1... | 11.. | 111. | 1111 | 1111 | 111. | 11.. | 1... | ...1 | ..1. | .1.. | 1..1 |
| s11 | 1... | 1... | .... | .... | .... | .... | .... | .... | .... | .1.. | ..1. | ...1 | 1... | 11.. | 111. | 1111 | .111 |
| s10 | .1.. | .1.. | .... | .... | .... | .... | .... | .... | .... | .11. | ..11 | 1..1 | .1.. | ..1. | ...1 | 1... | 11.. |

TABLE 1-continued

Encode Table

| | | | | | | | | | | | | | | | | | | |
|---|---|---|---|---|---|---|---|---|---|---|---|---|---|---|---|---|---|---|
| s09 | ..1. | ..1. | .... | .... | .... | .... | .... | .... | .... | .... | ..11 | 1..1 | .1.. | ..1. | ...1 | 1... | 11.. | 111. |
| s08 | ...1 | ...1 | .... | .... | .... | .... | .... | .... | .... | .... | 1..1 | .1.. | ..1. | ...1 | 1... | 11.. | 111. | 1111 |
| s07 | ..1. | .1.. | 1... | 1... | 1... | 1... | 1... | 1... | 1... | 1... | .... | .... | .... | .... | .... | .... | .... | .... |
| s06 | ..11 | .11. | .1.. | .1.. | .1.. | .1.. | .1.. | .1.. | .1.. | .1.. | .... | .... | .... | .... | .... | .... | .... | .... |
| s05 | 1..1 | ..11 | ..1. | ..1. | ..1. | ..1. | ..1. | ..1. | ..1. | ..1. | .... | .... | .... | .... | .... | .... | .... | .... |
| s04 | .1.. | 1..1 | ...1 | ...1 | ...1 | ...1 | ...1 | ...1 | ...1 | ...1 | .... | .... | .... | .... | .... | .... | .... | .... |
| s03 | 1111 | .111 | .111 | 1111 | 111. | 11.. | 1... | ...1 | .1.. | .1.. | 1... | 1... | 1... | 1... | 1... | 1... | 1... | 1... |
| s02 | 1... | 11.. | 11.. | 1... | ...1 | ..1. | .1.. | 1..1 | ..11 | .11. | .1.. | .1.. | .1.. | .1.. | .1.. | .1.. | .1.. | .1.. |
| s01 | 11.. | 111. | 111. | 11.. | 1... | ...1 | ..1. | .1.. | 1..1 | ..11 | ..1. | ..1. | ..1. | ..1. | ..1. | ..1. | ..1. | ..1. |
| s00 | 111. | 1111 | 1111 | 111. | 11.. | 1... | ...1 | ..1. | .1.. | 1..1 | ...1 | ...1 | ...1 | ...1 | ...1 | ...1 | ...1 | ...1 |

The encode table essentially comprises 16-144 bit words respectively identified as words S00 to S15. Each "1" in the table represents a logical high state, while each "." represents a logical low state (i.e., a "0"). Moreover, due to spacing constraints, the encode table is shown as wrapping around from nibble 17 to nibble 18. The encode table may be formed by any of a variety of techniques, such as that discussed below with regard to FIG. 5.

For convenience, each word is broken up into 36 four bit nibbles (shown as nibbles 0-35). Moreover, each column in the first 32 nibbles of the encode table has 16 bits of data that relate to one bit of the data word to be stored (that relationship is discussed below with regard to FIG. 6). For example, the data relating to the least significant bit of nibble 0 (of the data word to be stored) is the following 16-bit word:

0011 1001 0000 0001 (i.e., h3901 in hexadecimal)

The encoder 24 generates each of the 16 bits of the checksum value by applying a logical function to selected bits of the store word. Such bits are selected based upon the first 128 bits of each 144 bit data word of the encode table (i.e., based upon nibbles 0-31 of each word and referred to as the "encode words"). For example, the encoder 24 forms the least significant bit of the checksum value by applying a logical function to selected bits of the store word based upon the encode word S00 (i.e., based upon nibbles 0-31 of encode word S00).

To that end, the encoder 24 first determines which of the 128 bits of the encode word is at a logical high state. It then continues by applying an XOR function to all corresponding bits of the store word. For example, using the values of encode word S00 shown in Table 1, the encoder 24 applies an XOR function to bits 0, 4, 8, 12, 16, 20, 24, 28, 32, 35, 38, 41, 44, 51, 54, 55, 57, etc. . . . of the store word to produce the least significant bit of the checksum value. Illustrative embodiments use parallel logic gates in an effort to minimize the total gate count. The encoder 24 successively repeats this process 15 more times for each remaining encode word S01-S15 until it generates the entire 16-bit checksum value.

Returning to step 402, the process continues to step 404, in which both the store word and the checksum respectively are stored in data memory 26 and checksum memory 28. The process then pauses at step 406 until a request to read the store word is received. Among other things, such a request may be made by the local node 10, another node, or an external device.

After it detects a read request, the decoder 30 uses the store word and checksum value to generate a 16-bit syndrome value (step 408). To that end, the decoder 30 appends the checksum value to the most significant bit (i.e., immediately after nibble 31) of each encode word. Specifically, rather than use the values shown in Table 1 for nibbles 32-35 (which are used for another purpose, discussed below), the decoder 30 uses the 16-bit syndrome value as the most significant bits of each encode word. Accordingly, for a given store word, the 16 most significant bits of all of the encode words S00-S15 are identical. The decoder 30 also appends the checksum value to the most significant bit of the store word to form an "appended store word."

In a manner similar to that used by the encoder 24 to generate the checksum, the decoder 30 applies a logical function to selected bits of the appended store word based upon the appended encode words. Accordingly, using the values of encode word S00 shown in Table 1, the encoder 24 applies some function to bits 0, 4, 8, 12, 16, 20, 24, 28, 32, 35, 38, 41, 44, 51, 54, 55, 57, etc. . . . of the appended store word to produce the least significant bit of the syndrome. The decoder 30 repeats this process 15 more times for each remaining encode word S01-S15 until it generates the entire 16-bit syndrome value ("generated syndrome"). In illustrative embodiments, rather than use an XOR function, the decoder 30 uses the so-called "XNOR" function (also referred to as the "XOR-bar" function).

If the generated syndrome has a zero value, then the store word is deemed to have no bit errors. Accordingly, the process continues to step 410, which determines if the generated syndrome is a nonzero value. If not, then the store word is forwarded as requested through the data output 18 or 20 (step 412). Conversely, if the generated syndrome is a nonzero value, then the process continues to step 414, which attempts to correct the error (discussed below). Details of step 414 are discussed with regard to FIG. 4B.

Figure 4B:
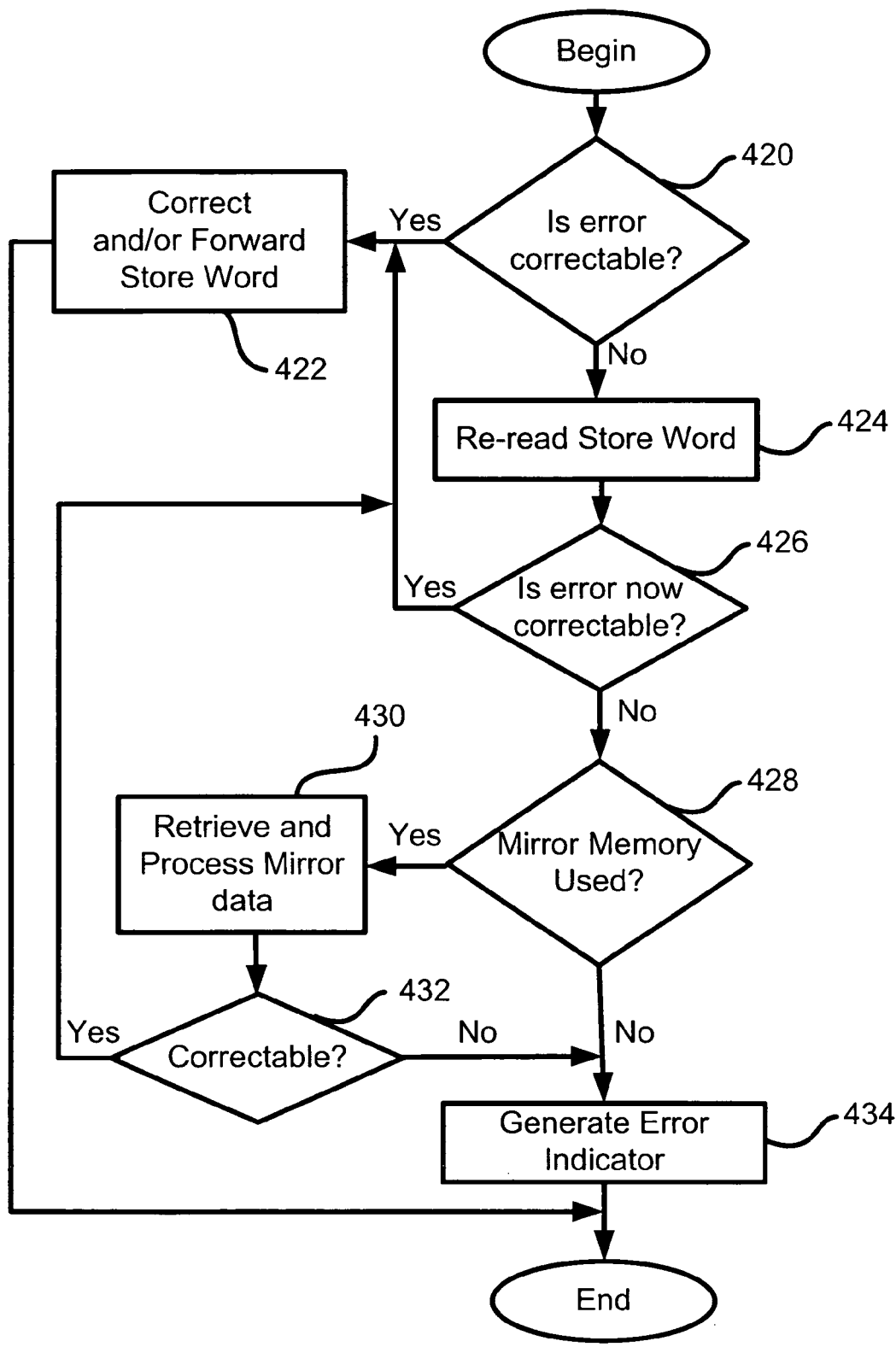
FIG. 4B shows a process of responding to a memory error detected by the process of FIG. 4A.

Specifically, the process of FIG. 4B begins at step 420 by determining if the error is correctable. To that end, the comparator 36 (within the error module 32) compares the generated syndrome with a plurality of syndrome values stored in a pre-formed decode table to determine if the retrieved store word has any bit errors.

Table 2 below shows an exemplary decode table that may be used with illustrative embodiments.

TABLE 2

| DECODE TABLE | | | | | | | | |
|---|---|---|---|---|---|---|---|---|
| Bit No. | Col. 1 | Col. 2 | Col. 3 | Col. 4 | Col. 5 | Col. 6 | Col. 7 | Col. 8 |
| Bit = 000 | "16'h3901", | "16'h5203", | "16'hf605", | "16'h9d07", | "16'h2e09", | "16'h450b", | "16'he10d", | "16'h8a0f", |
| Bit = 001 | "16'h6b02", | "16'h5203", | "16'ha406", | "16'h9d07", | "16'h7c0a", | "16'h450b", | "16'hb30e", | "16'h8a0f", |

TABLE 2-continued

DECODE TABLE

| Bit No. | Col. 1 | Col. 2 | Col. 3 | Col. 4 | Col. 5 | Col. 6 | Col. 7 | Col. 8 |
|---|---|---|---|---|---|---|---|---|
| Bit = 002 | "16'hcf04", | "16'hf605", | "16'ha406", | "16'h9d07", | "16'hd80c", | "16'he10d", | "16'hb30e", | "16'h8a0f", |
| Bit = 003 | "16'h1708", | "16'h2e09", | "16'h7c0a", | "16'h450b", | "16'hd80c", | "16'he10d", | "16'hb30e", | "16'h8a0f", |
| Bit = 004 | "16'h6801", | "16'ha103", | "16'h7305", | "16'hba07", | "16'h4709", | "16'h8e0b", | "16'h5c0d", | "16'h950f", |
| Bit = 005 | "16'hc902", | "16'ha103", | "16'hd206", | "16'hba07", | "16'he60a", | "16'h8e0b", | "16'hfd0e", | "16'h950f", |
| Bit = 006 | "16'h1b04", | "16'h7305", | "16'hd206", | "16'hba07", | "16'h340c", | "16'h5c0d", | "16'hfd0e", | "16'h950f", |
| Bit = 007 | "16'h2f08", | "16'h4709", | "16'he60a", | "16'h8e0b", | "16'h340c", | "16'h5c0d", | "16'hfd0e", | "16'h950f", |
| Bit = 008 | "16'hc401", | "16'hdc03", | "16'hed05", | "16'hf507", | "16'h8f09", | "16'h970b", | "16'ha60d", | "16'hbe0f", |
| Bit = 009 | "16'h1802", | "16'hdc03", | "16'h3106", | "16'hf507", | "16'h530a", | "16'h970b", | "16'h7a0e", | "16'hbe0f", |
| Bit = 010 | "16'h2904", | "16'hed05", | "16'h3106", | "16'hf507", | "16'h620c", | "16'ha60d", | "16'h7a0e", | "16'hbe0f", |
| Bit = 011 | "16'h4b08", | "16'h8f09", | "16'h530a", | "16'h970b", | "16'h620c", | "16'ha60d", | "16'h7a0e", | "16'hbe0f", |
| Bit = 012 | "16'h1201", | "16'h3603", | "16'h5a05", | "16'h7e07", | "16'h9b09", | "16'hbf0b", | "16'hd30d", | "16'hf70f", |
| Bit = 013 | "16'h2402", | "16'h3603", | "16'h6c06", | "16'h7e07", | "16'had0a", | "16'hbf0b", | "16'he50e", | "16'hf70f", |
| Bit = 014 | "16'h4804", | "16'h5a05", | "16'h6c06", | "16'h7e07", | "16'hc10c", | "16'hd30d", | "16'he50e", | "16'hf70f", |
| Bit = 015 | "16'h8908", | "16'h9b09", | "16'had0a", | "16'hbf0b", | "16'hc10c", | "16'hd30d", | "16'he50e", | "16'hf70f", |
| Bit = 016 | "16'h2101", | "16'h6303", | "16'ha505", | "16'he707", | "16'hb909", | "16'hfb0b", | "16'h3d0d", | "16'h7f0f", |
| Bit = 017 | "16'h4202", | "16'h6303", | "16'hc606", | "16'he707", | "16'hda0a", | "16'hfb0b", | "16'h5e0e", | "16'h7f0f", |
| Bit = 018 | "16'h8404", | "16'ha505", | "16'hc606", | "16'he707", | "16'h1c0c", | "16'h3d0d", | "16'h5e0e", | "16'h7f0f", |
| Bit = 019 | "16'h9808", | "16'hb909", | "16'hda0a", | "16'hfb0b", | "16'h1c0c", | "16'h3d0d", | "16'h5e0e", | "16'h7f0f", |
| Bit = 020 | "16'h4c01", | "16'hcd03", | "16'hde05", | "16'h5f07", | "16'hf809", | "16'h790b", | "16'h6a0d", | "16'heb0f", |
| Bit = 021 | "16'h8102", | "16'hcd03", | "16'h1306", | "16'h5f07", | "16'h350a", | "16'h790b", | "16'ha70e", | "16'heb0f", |
| Bit = 022 | "16'h9204", | "16'hde05", | "16'h1306", | "16'h5f07", | "16'h260c", | "16'h6a0d", | "16'ha70e", | "16'heb0f", |
| Bit = 023 | "16'hb408", | "16'hf809", | "16'h350a", | "16'h790b", | "16'h260c", | "16'h6a0d", | "16'ha70e", | "16'heb0f", |
| Bit = 024 | "16'h8601", | "16'h1a03", | "16'h3705", | "16'hab07", | "16'h7409", | "16'he80b", | "16'hc50d", | "16'h590f", |
| Bit = 025 | "16'h9c02", | "16'h1a03", | "16'h2d06", | "16'hab07", | "16'h6e0a", | "16'he80b", | "16'hdf0e", | "16'h590f", |
| Bit = 026 | "16'hb104", | "16'h3705", | "16'h2d06", | "16'hab07", | "16'h430c", | "16'hc50d", | "16'hdf0e", | "16'h590f", |
| Bit = 027 | "16'hf208", | "16'h7409", | "16'h6e0a", | "16'he80b", | "16'h430c", | "16'hc50d", | "16'hdf0e", | "16'h590f", |
| Bit = 028 | "16'h9301", | "16'h2503", | "16'h6f05", | "16'hd907", | "16'he209", | "16'h540b", | "16'h1e0d", | "16'ha80f", |
| Bit = 029 | "16'hb602", | "16'h2503", | "16'h4a06", | "16'hd907", | "16'hc70a", | "16'h540b", | "16'h3b0e", | "16'ha80f", |
| Bit = 030 | "16'hfc04", | "16'h6f05", | "16'h4a06", | "16'hd907", | "16'h8d0c", | "16'h1e0d", | "16'h3b0e", | "16'ha80f", |
| Bit = 031 | "16'h7108", | "16'he209", | "16'hc70a", | "16'h540b", | "16'h8d0c", | "16'h1e0d", | "16'h3b0e", | "16'ha80f", |
| Bit = 032 | "16'h9013", | "16'h2035", | "16'h605f", | "16'hd079", | "16'he092", | "16'h50b4", | "16'h10de", | "16'ha0f8", |
| Bit = 033 | "16'hb026", | "16'h2035", | "16'h406a", | "16'hd079", | "16'hc0a7", | "16'h50b4", | "16'h30eb", | "16'ha0f8", |
| Bit = 034 | "16'hf04c", | "16'h605f", | "16'h406a", | "16'hd079", | "16'h80cd", | "16'h10de", | "16'h30eb", | "16'ha0f8", |
| Bit = 035 | "16'h7081", | "16'he092", | "16'hc0a7", | "16'h50b4", | "16'h80cd", | "16'h10de", | "16'h30eb", | "16'ha0f8", |
| Bit = 036 | "16'h8016", | "16'h103a", | "16'h3057", | "16'ha07b", | "16'h7094", | "16'he0b8", | "16'hc0d5", | "16'h50f9", |
| Bit = 037 | "16'h902c", | "16'h103a", | "16'h206d", | "16'ha07b", | "16'h60ae", | "16'he0b8", | "16'hd0ef", | "16'h50f9", |
| Bit = 038 | "16'hb041", | "16'h3057", | "16'h206d", | "16'ha07b", | "16'h40c3", | "16'hc0d5", | "16'hd0ef", | "16'h50f9", |
| Bit = 039 | "16'hf082", | "16'h7094", | "16'h60ae", | "16'he0b8", | "16'h40c3", | "16'hc0d5", | "16'hd0ef", | "16'h50f9", |
| Bit = 040 | "16'h401c", | "16'hc03d", | "16'hd05e", | "16'h507f", | "16'hf098", | "16'h70b9", | "16'h60da", | "16'he0fb", |
| Bit = 041 | "16'h8021", | "16'hc03d", | "16'h1063", | "16'h507f", | "16'h30a5", | "16'h70b9", | "16'ha0e7", | "16'he0fb", |
| Bit = 042 | "16'h9042", | "16'hd05e", | "16'h1063", | "16'h507f", | "16'h20c6", | "16'h60da", | "16'ha0e7", | "16'he0fb", |
| Bit = 043 | "16'hb084", | "16'hf098", | "16'h30a5", | "16'h70b9", | "16'h20c6", | "16'h60da", | "16'ha0e7", | "16'he0fb", |
| Bit = 044 | "16'h2011", | "16'h6033", | "16'ha055", | "16'he077", | "16'hb099", | "16'hf0bb", | "16'h30dd", | "16'h70ff", |
| Bit = 045 | "16'h4022", | "16'h6033", | "16'hc066", | "16'he077", | "16'hd0aa", | "16'hf0bb", | "16'h50ee", | "16'h70ff", |
| Bit = 046 | "16'h8044", | "16'ha055", | "16'hc066", | "16'he077", | "16'h10cc", | "16'h30dd", | "16'h50ee", | "16'h70ff", |
| Bit = 047 | "16'h9088", | "16'hb099", | "16'hd0aa", | "16'hf0bb", | "16'h10cc", | "16'h30dd", | "16'h50ee", | "16'h70ff", |
| Bit = 048 | "16'h1012", | "16'h3036", | "16'h505a", | "16'h707e", | "16'h909b", | "16'hb0bf", | "16'hd0d3", | "16'hf0f7", |
| Bit = 049 | "16'h2024", | "16'h3036", | "16'h606c", | "16'h707e", | "16'ha0ad", | "16'hb0bf", | "16'he0e5", | "16'hf0f7", |
| Bit = 050 | "16'h4048", | "16'h505a", | "16'h606c", | "16'h707e", | "16'hc0c1", | "16'hd0d3", | "16'he0e5", | "16'hf0f7", |
| Bit = 051 | "16'h8089", | "16'h909b", | "16'ha0ad", | "16'hb0bf", | "16'hc0c1", | "16'hd0d3", | "16'he0e5", | "16'hf0f7", |
| Bit = 052 | "16'hc014", | "16'hd03c", | "16'he05d", | "16'hf075", | "16'h809f", | "16'h90b7", | "16'ha0d6", | "16'hb0fe", |
| Bit = 053 | "16'h1028", | "16'hd03c", | "16'h3061", | "16'hf075", | "16'h50a3", | "16'h90b7", | "16'h70ea", | "16'hb0fe", |
| Bit = 054 | "16'h2049", | "16'he05d", | "16'h3061", | "16'hf075", | "16'h60c2", | "16'ha0d6", | "16'h70ea", | "16'hb0fe", |
| Bit = 055 | "16'h408b", | "16'h50a3", | "16'h90b7", | "16'h60c2", | "16'ha0d6", | "16'h70ea", | "16'hb0fe", | |
| Bit = 056 | "16'h6018", | "16'ha031", | "16'h7053", | "16'hb07a", | "16'h4097", | "16'h80be", | "16'h50dc", | "16'h90f5", |
| Bit = 057 | "16'hc029", | "16'ha031", | "16'hd062", | "16'hb07a", | "16'he0a6", | "16'h80be", | "16'hf0ed", | "16'h90f5", |
| Bit = 058 | "16'h104b", | "16'h7053", | "16'hd062", | "16'hb07a", | "16'h30c4", | "16'h50dc", | "16'hf0ed", | "16'h90f5", |
| Bit = 059 | "16'h208f", | "16'h4097", | "16'he0a6", | "16'h80be", | "16'h30c4", | "16'h50dc", | "16'hf0ed", | "16'h90f5", |
| Bit = 060 | "16'h3019", | "16'h5032", | "16'hf056", | "16'h907d", | "16'h209e", | "16'h40b5", | "16'he0d1", | "16'h80fa", |
| Bit = 061 | "16'h602b", | "16'h5032", | "16'ha064", | "16'h907d", | "16'h70ac", | "16'h40b5", | "16'hb0e3", | "16'h80fa", |
| Bit = 062 | "16'hc04f", | "16'hf056", | "16'ha064", | "16'h907d", | "16'hd0c8", | "16'he0d1", | "16'hb0e3", | "16'h80fa", |
| Bit = 063 | "16'h1087", | "16'h209e", | "16'h70ac", | "16'h40b5", | "16'hd0c8", | "16'he0d1", | "16'hb0e3", | "16'h80fa", |
| Bit = 064 | "16'h0139", | "16'h0352", | "16'h05f6", | "16'h079d", | "16'h092e", | "16'h0b45", | "16'h0de1", | "16'h0f8a", |
| Bit = 065 | "16'h026b", | "16'h0352", | "16'h06a4", | "16'h079d", | "16'h0a7c", | "16'h0b45", | "16'h0eb3", | "16'h0f8a", |
| Bit = 066 | "16'h04cf", | "16'h05f6", | "16'h06a4", | "16'h079d", | "16'h0cd8", | "16'h0de1", | "16'h0eb3", | "16'h0f8a", |
| Bit = 067 | "16'h0817", | "16'h092e", | "16'h0a7c", | "16'h0b45", | "16'h0cd8", | "16'h0de1", | "16'h0eb3", | "16'h0f8a", |
| Bit = 068 | "16'h0168", | "16'h03a1", | "16'h0573", | "16'h07ba", | "16'h0947", | "16'h0b8e", | "16'h0d5c", | "16'h0f95", |
| Bit = 069 | "16'h02c9", | "16'h03a1", | "16'h06d2", | "16'h07ba", | "16'h0ae6", | "16'h0b8e", | "16'h0efd", | "16'h0f95", |
| Bit = 070 | "16'h041b", | "16'h0573", | "16'h06d2", | "16'h07ba", | "16'h0c34", | "16'h0d5c", | "16'h0efd", | "16'h0f95", |
| Bit = 071 | "16'h082f", | "16'h0947", | "16'h0ae6", | "16'h0b8e", | "16'h0c34", | "16'h0d5c", | "16'h0efd", | "16'h0f95", |
| Bit = 072 | "16'h01c4", | "16'h03dc", | "16'h05ed", | "16'h07f5", | "16'h098f", | "16'h0b97", | "16'h0da6", | "16'h0fbe", |
| Bit = 073 | "16'h0218", | "16'h03dc", | "16'h0631", | "16'h07f5", | "16'h0a53", | "16'h0b97", | "16'h0e7a", | "16'h0fbe", |
| Bit = 074 | "16'h0429", | "16'h05ed", | "16'h0631", | "16'h07f5", | "16'h0c62", | "16'h0da6", | "16'h0e7a", | "16'h0fbe", |
| Bit = 075 | "16'h084b", | "16'h098f", | "16'h0a53", | "16'h0b97", | "16'h0c62", | "16'h0da6", | "16'h0e7a", | "16'h0fbe", |
| Bit = 076 | "16'h0112", | "16'h0336", | "16'h055a", | "16'h077e", | "16'h099b", | "16'h0bbf", | "16'h0dd3", | "16'h0ff7", |

TABLE 2-continued

DECODE TABLE

| Bit No. | Col. 1 | Col. 2 | Col. 3 | Col. 4 | Col. 5 | Col. 6 | Col. 7 | Col. 8 |
|---|---|---|---|---|---|---|---|---|
| Bit = 077 | "16'h0224", | "16'h0336", | "16'h066c", | "16'h077e", | "16'h0aad", | "16'h0bbf", | "16'h0ee5", | "16'h0ff7", |
| Bit = 078 | "16'h0448", | "16'h055a", | "16'h066c", | "16'h077e", | "16'h0cc1", | "16'h0dd3", | "16'h0ee5", | "16'h0ff7", |
| Bit = 079 | "16'h0889", | "16'h099b", | "16'h0aad", | "16'h0bbf", | "16'h0cc1", | "16'h0dd3", | "16'h0ee5", | "16'h0ff7", |
| Bit = 080 | "16'h0121", | "16'h0363", | "16'h05a5", | "16'h07e7", | "16'h09b9", | "16'h0bfb", | "16'h0d3d", | "16'h0f7f", |
| Bit = 081 | "16'h0242", | "16'h0363", | "16'h06c6", | "16'h07e7", | "16'h0ada", | "16'h0bfb", | "16'h0e5e", | "16'h0f7f", |
| Bit = 082 | "16'h0484", | "16'h05a5", | "16'h06c6", | "16'h07e7", | "16'h0c1c", | "16'h0d3d", | "16'h0e5e", | "16'h0f7f", |
| Bit = 083 | "16'h0898", | "16'h09b9", | "16'h0ada", | "16'h0bfb", | "16'h0c1c", | "16'h0d3d", | "16'h0e5e", | "16'h0f7f", |
| Bit = 084 | "16'h014c", | "16'h03cd", | "16'h05de", | "16'h075f", | "16'h09f8", | "16'h0b79", | "16'h0d6a", | "16'h0feb", |
| Bit = 085 | "16'h0281", | "16'h03cd", | "16'h0613", | "16'h075f", | "16'h0a35", | "16'h0b79", | "16'h0ea7", | "16'h0feb", |
| Bit = 086 | "16'h0492", | "16'h05de", | "16'h0613", | "16'h075f", | "16'h0c26", | "16'h0d6a", | "16'h0ea7", | "16'h0feb", |
| Bit = 087 | "16'h08b4", | "16'h09f8", | "16'h0a35", | "16'h0b79", | "16'h0c26", | "16'h0d6a", | "16'h0ea7", | "16'h0feb", |
| Bit = 088 | "16'h0186", | "16'h031a", | "16'h0537", | "16'h07ab", | "16'h0974", | "16'h0be8", | "16'h0dc5", | "16'h0f59", |
| Bit = 089 | "16'h029c", | "16'h031a", | "16'h062d", | "16'h07ab", | "16'h0a6e", | "16'h0be8", | "16'h0edf", | "16'h0f59", |
| Bit = 090 | "16'h04b1", | "16'h0537", | "16'h062d", | "16'h07ab", | "16'h0c43", | "16'h0dc5", | "16'h0edf", | "16'h0f59", |
| Bit = 091 | "16'h08f2", | "16'h0974", | "16'h0a6e", | "16'h0be8", | "16'h0c43", | "16'h0dc5", | "16'h0edf", | "16'h0f59", |
| Bit = 092 | "16'h0193", | "16'h0325", | "16'h056f", | "16'h07d9", | "16'h09e2", | "16'h0b54", | "16'h0d1e", | "16'h0fa8", |
| Bit = 093 | "16'h02b6", | "16'h0325", | "16'h064a", | "16'h07d9", | "16'h0ac7", | "16'h0b54", | "16'h0e3b", | "16'h0fa8", |
| Bit = 094 | "16'h04fc", | "16'h056f", | "16'h064a", | "16'h07d9", | "16'h0c8d", | "16'h0d1e", | "16'h0e3b", | "16'h0fa8", |
| Bit = 095 | "16'h0871", | "16'h09e2", | "16'h0ac7", | "16'h0b54", | "16'h0c8d", | "16'h0d1e", | "16'h0e3b", | "16'h0fa8", |
| Bit = 096 | "16'h1390", | "16'h3520", | "16'h5f60", | "16'h79d0", | "16'h92e0", | "16'hb450", | "16'hde10", | "16'hf8a0", |
| Bit = 097 | "16'h26b0", | "16'h3520", | "16'h6a40", | "16'h79d0", | "16'ha7c0", | "16'hb450", | "16'heb30", | "16'hf8a0", |
| Bit = 098 | "16'h4cf0", | "16'h5f60", | "16'h6a40", | "16'h79d0", | "16'hcd80", | "16'hde10", | "16'heb30", | "16'hf8a0", |
| Bit = 099 | "16'h8170", | "16'h92e0", | "16'ha7c0", | "16'hb450", | "16'hcd80", | "16'hde10", | "16'heb30", | "16'hf8a0", |
| Bit = 100 | "16'h1680", | "16'h3a10", | "16'h5730", | "16'h7ba0", | "16'h9470", | "16'hb8e0", | "16'hd5c0", | "16'hf950", |
| Bit = 101 | "16'h2c90", | "16'h3a10", | "16'h6d20", | "16'h7ba0", | "16'hae60", | "16'hb8e0", | "16'hefd0", | "16'hf950", |
| Bit = 102 | "16'h41b0", | "16'h5730", | "16'h6d20", | "16'h7ba0", | "16'hc340", | "16'hd5c0", | "16'hefd0", | "16'hf950", |
| Bit = 103 | "16'h82f0", | "16'h9470", | "16'hae60", | "16'hb8e0", | "16'hc340", | "16'hd5c0", | "16'hefd0", | "16'hf950", |
| Bit = 104 | "16'h1c40", | "16'h3dc0", | "16'h5ed0", | "16'h7f50", | "16'h98f0", | "16'hb970", | "16'hda60", | "16'hfbe0", |
| Bit = 105 | "16'h2180", | "16'h3dc0", | "16'h6310", | "16'h7f50", | "16'ha530", | "16'hb970", | "16'he7a0", | "16'hfbe0", |
| Bit = 106 | "16'h4290", | "16'h5ed0", | "16'h6310", | "16'h7f50", | "16'hc620", | "16'hda60", | "16'he7a0", | "16'hfbe0", |
| Bit = 107 | "16'h84b0", | "16'h98f0", | "16'ha530", | "16'hb970", | "16'hc620", | "16'hda60", | "16'he7a0", | "16'hfbe0", |
| Bit = 108 | "16'h1120", | "16'h3360", | "16'h55a0", | "16'h77e0", | "16'h99b0", | "16'hbbf0", | "16'hdd30", | "16'hff70", |
| Bit = 109 | "16'h2240", | "16'h3360", | "16'h66c0", | "16'h77e0", | "16'haad0", | "16'hbbf0", | "16'hee50", | "16'hff70", |
| Bit = 110 | "16'h4480", | "16'h55a0", | "16'h66c0", | "16'h77e0", | "16'hcc10", | "16'hdd30", | "16'hee50", | "16'hff70", |
| Bit = 111 | "16'h8890", | "16'h99b0", | "16'haad0", | "16'hbbf0", | "16'hcc10", | "16'hdd30", | "16'hee50", | "16'hff70", |
| Bit = 112 | "16'h1210", | "16'h3630", | "16'h5a50", | "16'h7e70", | "16'h9b90", | "16'hbfb0", | "16'hd3d0", | "16'hf7f0", |
| Bit = 113 | "16'h2420", | "16'h3630", | "16'h6c60", | "16'h7e70", | "16'hada0", | "16'hbfb0", | "16'he5e0", | "16'hf7f0", |
| Bit = 114 | "16'h4840", | "16'h5a50", | "16'h6c60", | "16'h7e70", | "16'hc1c0", | "16'hd3d0", | "16'he5e0", | "16'hf7f0", |
| Bit = 115 | "16'h8980", | "16'h9b90", | "16'hada0", | "16'hbfb0", | "16'hc1c0", | "16'hd3d0", | "16'he5e0", | "16'hf7f0", |
| Bit = 116 | "16'h14c0", | "16'h3cd0", | "16'h5de0", | "16'h75f0", | "16'h9f80", | "16'hb790", | "16'hd6a0", | "16'hfeb0", |
| Bit = 117 | "16'h2810", | "16'h3cd0", | "16'h6130", | "16'h75f0", | "16'ha350", | "16'hb790", | "16'hea70", | "16'hfeb0", |
| Bit = 118 | "16'h4920", | "16'h5de0", | "16'h6130", | "16'h75f0", | "16'hc260", | "16'hd6a0", | "16'hea70", | "16'hfeb0", |
| Bit = 119 | "16'h8b40", | "16'h9f80", | "16'ha350", | "16'hb790", | "16'hc260", | "16'hd6a0", | "16'hea70", | "16'hfeb0", |
| Bit = 120 | "16'h1860", | "16'h31a0", | "16'h5370", | "16'h7ab0", | "16'h9740", | "16'hbe80", | "16'hdc50", | "16'hf590", |
| Bit = 121 | "16'h29c0", | "16'h31a0", | "16'h62d0", | "16'h7ab0", | "16'ha6e0", | "16'hbe80", | "16'hedf0", | "16'hf590", |
| Bit = 122 | "16'h4b10", | "16'h5370", | "16'h62d0", | "16'h7ab0", | "16'hc430", | "16'hdc50", | "16'hedf0", | "16'hf590", |
| Bit = 123 | "16'h8f20", | "16'h9740", | "16'ha6e0", | "16'hbe80", | "16'hc430", | "16'hdc50", | "16'hedf0", | "16'hf590", |
| Bit = 124 | "16'h1930", | "16'h3250", | "16'h56f0", | "16'h7d90", | "16'h9e20", | "16'hb540", | "16'hd1e0", | "16'hfa80", |
| Bit = 125 | "16'h2b60", | "16'h3250", | "16'h64a0", | "16'h7d90", | "16'hac70", | "16'hb540", | "16'he3b0", | "16'hfa80", |
| Bit = 126 | "16'h4fc0", | "16'h56f0", | "16'h64a0", | "16'h7d90", | "16'hc8d0", | "16'hd1e0", | "16'he3b0", | "16'hfa80", |
| Bit = 127 | "16'h8710", | "16'h9e20", | "16'hac70", | "16'hb540", | "16'hc8d0", | "16'hd1e0", | "16'he3b0", | "16'hfa80", |
| Bit = 128 | "16'h0001", | "16'h0003", | "16'h0005", | "16'h0007", | "16'h0009", | "16'h000b", | "16'h000d", | "16'h000f", |
| Bit = 129 | "16'h0002", | "16'h0003", | "16'h0006", | "16'h0007", | "16'h000a", | "16'h000b", | "16'h000e", | "16'h000f", |
| Bit = 130 | "16'h0004", | "16'h0005", | "16'h0006", | "16'h0007", | "16'h000c", | "16'h000d", | "16'h000e", | "16'h000f", |
| Bit = 131 | "16'h0008", | "16'h0009", | "16'h000a", | "16'h000b", | "16'h000c", | "16'h000d", | "16'h000e", | "16'h000f", |
| Bit = 132 | "16'h0010", | "16'h0030", | "16'h0050", | "16'h0070", | "16'h0090", | "16'h00b0", | "16'h00d0", | "16'h00f0", |
| Bit = 133 | "16'h0020", | "16'h0030", | "16'h0060", | "16'h0070", | "16'h00a0", | "16'h00b0", | "16'h00e0", | "16'h00f0", |
| Bit = 134 | "16'h0040", | "16'h0050", | "16'h0060", | "16'h0070", | "16'h00c0", | "16'h00d0", | "16'h00e0", | "16'h00f0", |
| Bit = 135 | "16'h0080", | "16'h0090", | "16'h00a0", | "16'h00b0", | "16'h00c0", | "16'h00d0", | "16'h00e0", | "16'h00f0", |
| Bit = 136 | "16'h0100", | "16'h0300", | "16'h0500", | "16'h0700", | "16'h0900", | "16'h0b00", | "16'h0d00", | "16'h0f00", |
| Bit = 137 | "16'h0200", | "16'h0300", | "16'h0600", | "16'h0700", | "16'h0a00", | "16'h0b00", | "16'h0e00", | "16'h0f00", |
| Bit = 138 | "16'h0400", | "16'h0500", | "16'h0600", | "16'h0700", | "16'h0c00", | "16'h0d00", | "16'h0e00", | "16'h0f00", |
| Bit = 139 | "16'h0800", | "16'h0900", | "16'h0a00", | "16'h0b00", | "16'h0c00", | "16'h0d00", | "16'h0e00", | "16'h0f00", |
| Bit = 140 | "16'h1000", | "16'h3000", | "16'h5000", | "16'h7000", | "16'h9000", | "16'hb000", | "16'hd000", | "16'hf000", |
| Bit = 141 | "16'h2000", | "16'h3000", | "16'h6000", | "16'h7000", | "16'ha000", | "16'hb000", | "16'he000", | "16'hf000", |
| Bit = 142 | "16'h4000", | "16'h5000", | "16'h6000", | "16'h7000", | "16'hc000", | "16'hd000", | "16'he000", | "16'hf000", |
| Bit = 143 | "16'h8000", | "16'h9000", | "16'ha000", | "16'hb000", | "16'hc000", | "16'hd000", | "16'he000", | "16'hf000", |

The decode table thus has 144 rows with syndrome values that relate to one bit of the appended store word. Specifically, each row has eight 16-bit syndrome values (shown in the table in hexadecimal format) against which the comparator 36 compares the generated syndrome. The left-most column has "single bit error syndrome values," while the other columns have "multi-bit error syndrome values." In summary, the generated syndrome equals one of the single bit error syndrome values when the store word has a single bit error. In a corresponding manner, the generated syndrome equals one of the multi-bit error syndrome values when the store word has a multi-bit error (i.e., between two and four bit errors). For example, if the generated syndrome equals h8a0f, then bits 0 to 3 have an error. Details of this process follow.

More specifically, the error is considered to be correctable if the comparator 36 finds one or more matches in the decode table. As noted, the decode table has identical syndrome values for no more than four bits. The comparator 36 thus simply traverses the decode table to determine if between one and four syndrome values match the generated syndrome.

If there are one or more matches, then the comparator 36 records the row number(s) of the decode table having a matching syndrome value. By doing this, the comparator 36 generates a list of erroneous bits in the appended store word. In other words, because each row of the decode table corresponds to one bit of the appended store word, any row having a match identifies an error in the corresponding bit of the appended store word. For example, if the generated syndrome has a value of h5203, then bits 0 and 1 of the append store word are in error (i.e., rows 0 and 1 both have that syndrome value).

Accordingly, if the error is correctable (i.e., the comparator 36 finds one or more matches), then the corrector 38 corrects the bits in error and forwards the store word as requested (step 422). To that end, the corrector 38 may apply an XOR function to the bits in error.

If the comparator 36 finds no matches, then a double nibble error is considered to have occurred. Despite this, such an error still may be correctible. Specifically, some errors effectively self-correct if simply re-read (i.e., those errors are known as "transient errors"). A simple re-read of the store word thus may produce a completely error-free store word, or a store word having an error that is capable of being corrected. Accordingly, if the error is not correctable, the process continues to step 424, which re-reads the store word and repeats the process of determining if the word has any bit errors.

The process then determines at step 426 if the error is correctable after the store word is re-read and again checked for errors (i.e., assuming that some error remains after the store word is re-read). If the error is correctable, the process loops back to step 422, which corrects and forwards the store word. In a similar manner, if the store word is correct at this time (rather than merely being "correctable"), the process also continues to step 422, which forwards the store word via the output 18 or 20.

Conversely, if step 426 determines that the error still is not correctable, then the process continues to step 428, which determines if the node 10 uses a mirror memory. Specifically, some embodiments redundantly store the store word in another memory location (i.e., the mirror memory). In such case, the store word is retrieved from the mirror memory, and processed to determine if it also has any bit errors (step 430). If the store word in the mirror memory has no errors or is correctable (step 432), then it may be forwarded as discussed above with regard to step 422.

If the error still is not correctable at step 432, or no mirror memory has been used at this point in the process, then the process continues to step 434, in which the system generates an error indicator. Among other things, such an error indicator may shut down the executing application program, shut down the entire system (e.g., if the error is in the operating system kernel), or display an interrupt message on a display device.

In alternative embodiments, the corrector 38 may reconstruct the store word if the mirror memory copy also is uncorrectable. To that end, the corrector 38 may use accurate bits from each respective memory location to reconstruct either the store word, or a correctable version of the store word.

Figure 5:
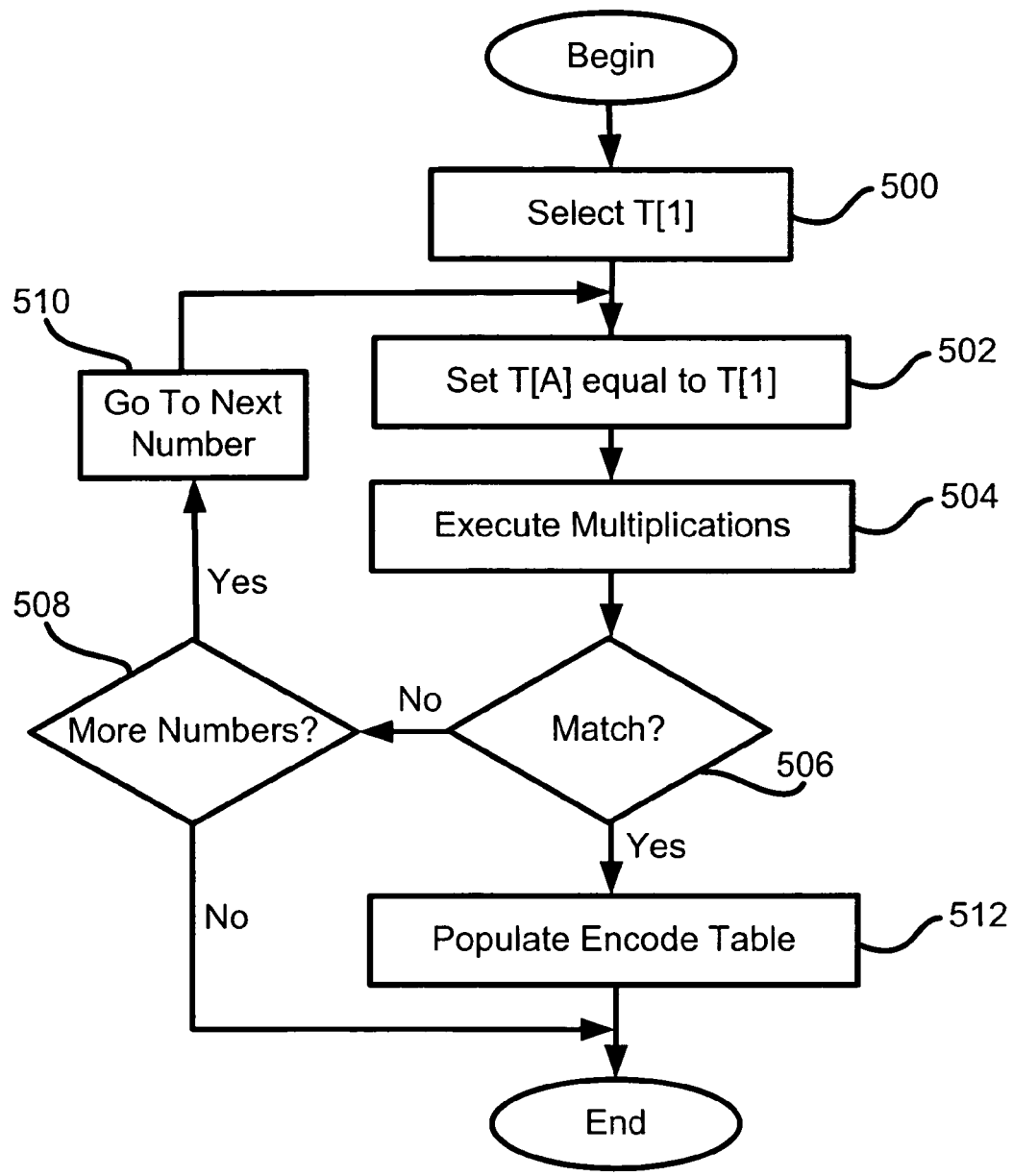
FIG. 5 shows a process of forming an encode table in accordance with illustrative embodiments of the invention.

As noted above, various means may be used to generate the encode and decode tables. FIG. 5 shows an exemplary process that may be used to generate the encode table. In summary, illustrative embodiments determine at least one arbitrary 4×4 matrix that satisfies a given algorithm, and then populate the encode table with various values derived from the algorithm.

Specifically, the process begins at step 500 by selecting T[1], which is some arbitrary 4×4 matrix that also may be represented as a 16-bit number. T[1] also may be represented as a number between 0 and 65,526 (i.e., 2 raised to the 16$^{th}$ power). Accordingly, the process may begin by setting T[1] equal to zero (i.e., a 4×4 matrix of zeros).

The process continues to step 502, in which another matrix, T[A], is set to be equal to T[1]. Next, the process continues to step 504, which executes the below series of multiplications and records every intervening T[n] value:

$$T[2] = T[1] * T[A];$$
$$T[3] = T[2] * T[A];$$
$$T[4] = T[3] * T[A];$$
$$T[5] = T[4] * T[A];$$
$$T[6] = T[5] * T[A];$$
$$T[7] = T[6] * T[A];$$
$$T[8] = T[7] * T[A];$$
$$T[9] = T[8] * T[A];$$
$$T[10] = T[9] * T[A];$$
$$T[11] = T[10] * T[A];$$
$$T[12] = T[11] * T[A];$$
$$T[13] = T[12] * T[A];$$
$$T[14] = T[13] * T[A];$$
$$T[15] = T[14] * T[A]; \text{Identity Matrix.}$$

In illustrative embodiments, the identity matrix is predetermined to be h8421, or:

$$\begin{bmatrix} 1 & 0 & 0 & 0 \end{bmatrix}$$
$$\begin{bmatrix} 0 & 1 & 0 & 0 \end{bmatrix}$$
$$\begin{bmatrix} 0 & 0 & 1 & 0 \end{bmatrix}$$
$$\begin{bmatrix} 0 & 0 & 0 & 1 \end{bmatrix}$$

Step 506 then determines if T[15] is equal to the identity matrix (i.e., equal to h8421). If not, then the process continues to step 508, which determines if all 65,526 potential values for T[1] have been processed. If more numbers exist, then the process increments T[1] to the next number (step 510), and loops back to step 502.

Returning to step 506, if T[15] is equal to the identity matrix, then the process continues to step 512 by populating the encode table with various T[n] values derived by step 504. In illustrative embodiments, the encode table is populated as shown below in Table 3:

TABLE 3

Part 3A:

| | | | | | | | | | | | | | | | |
|---|---|---|---|---|---|---|---|---|---|---|---|---|---|---|---|
| I | I | I | I | I | I | I | I | 0 | 0 | 0 | 0 | 0 | 0 | 0 | 0 |
| T11 | T12 | T13 | T14 | I | T1 | T2 | T3 | I | I | I | I | I | I | I | I |
| T3 | T2 | T1 | I | T14 | T13 | T12 | T11 | T11 | T12 | T13 | T14 | I | T1 | T2 | T3 |
| 0 | 0 | 0 | 0 | 0 | 0 | 0 | 0 | T3 | T2 | T1 | I | T14 | T13 | T12 | T11 |

Part 3B

| | | | | | | | | | | | | | | | |
|---|---|---|---|---|---|---|---|---|---|---|---|---|---|---|---|
| T3 | T2 | T1 | I | T14 | T13 | T12 | T11 | T11 | T12 | T13 | T14 | I | T1 | T2 | T3 |
| 0 | 0 | 0 | 0 | 0 | 0 | 0 | 0 | T3 | T2 | T1 | I | T14 | T13 | T12 | T11 |
| I | I | I | I | I | I | I | I | 0 | 0 | 0 | 0 | 0 | 0 | 0 | 0 |
| T11 | T12 | T13 | T14 | I | T1 | T2 | T3 | I | I | I | I | I | I | I | I |

Each row in Table 3 represents four rows of the encode table, while each column represents a nibble column in the encode table. Because of space constraints, Table 3 is shown in two parts, with Part 3B representing the least significant bits and Part 3A representing the most significant bits.

Using PERL code, it was determined that 5,265 values satisfy the above algorithm/equation. After verifying the results, however, only 1,344 of the 5,265 values were determined to satisfy the requirement for X4 correction. Such verified values yielded between 592 and 728 "1" values for the encode table. To minimize the gate count, the value selected for T[1] should yield a minimal number of "1" values (i.e., 592) in the encode table.

As an example, the encode table shown above in Table 1 was formed using the following values:

T[1]=h1942;
T[2]=h2394;
T[3]=h4639;
T[4]=h9d63;
T[5]=h3ad6;
T[6]=h65ad;
T[7]=hdb5a;
T[8]=ha7b5;
T[9]=h5f7b;
T[10]=hbef7;
T[11]=h7cef;
T[12]=hf8ce;
T[13]=he18c;
T[14]=hc218;
T[15]=h8421.

Figure 6:
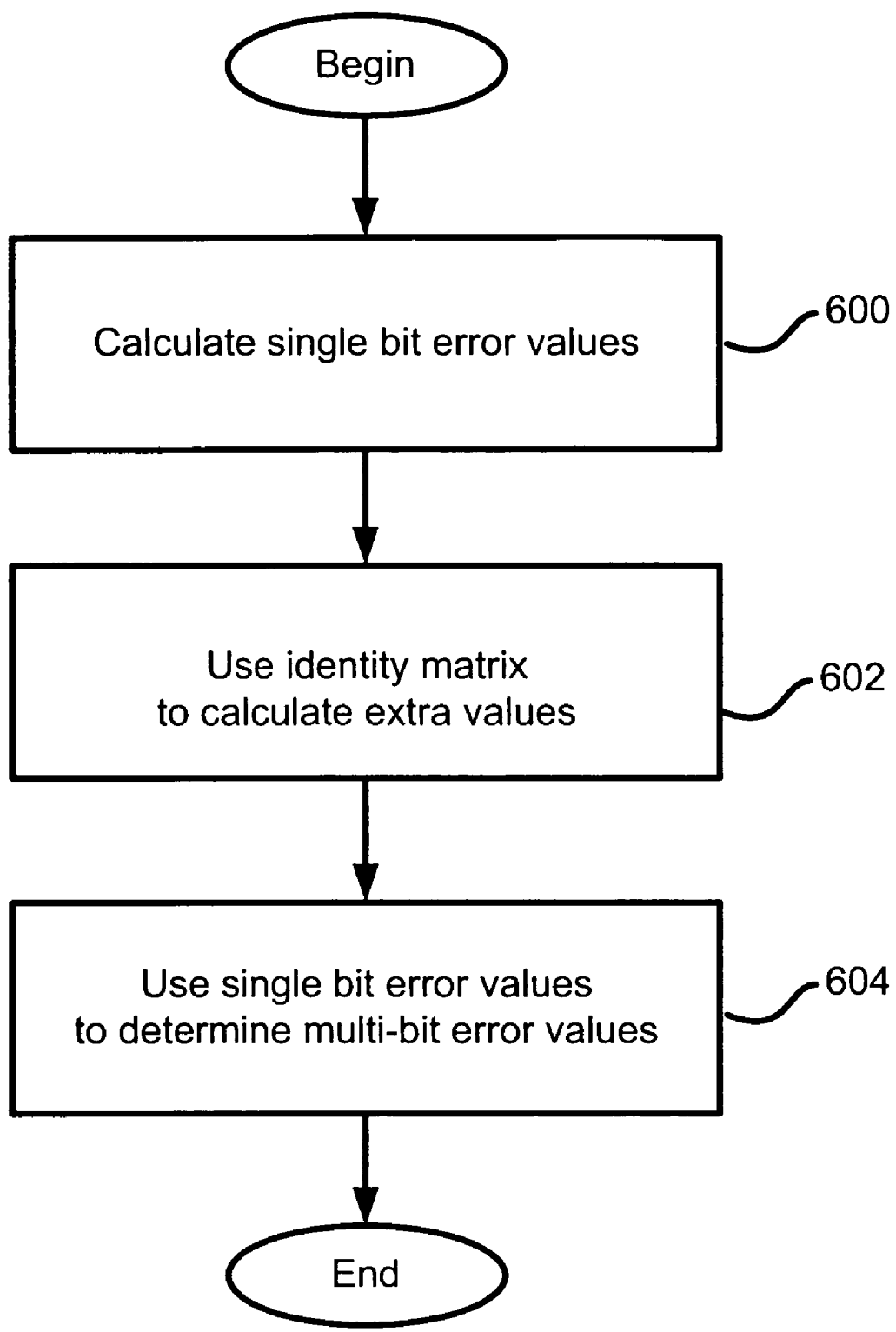
FIG. 6 shows a process of forming a decode table in accordance with illustrative embodiments of the invention.

FIG. 6 shows a process for generating the decode table, which is derived from the encode table. The process begins at step 600, which calculates the single bit error syndrome values for each bit in the appended word. More specifically, as noted above, each column of the encode table has data relating to a single bit of the store word. To generate a single bit error syndrome value for a single bit (e.g., bit 0), the process simply reads the 16 bits in the encode table column corresponding to that single bit being processed. The most significant bit starts at row S15, while the least significant bit starts at row S00. Accordingly, using the values in Table 1, the single bit error syndrome value for bit 0 is:

0011 1001 0000 0001 (h3901) (Bit 0 single bit error syndrome value)

Any generated syndrome matching this value therefore indicates a single bit error at bit 0. The process thus traverses the entire encode table in this manner, bit by bit (i.e., column by column), to generate such syndrome values.

Rows 128 through 143 of the decode table are derived simply by adding the identity matrix in the manner shown in Table 1 above (see nibbles 32-35 of Table 2, step 602). This enables illustrative embodiments to also check the accuracy of the checksum value as it is read from memory.

The process continues to step 604, which uses the single bit error syndrome values of column one to calculate multi-bit error values (i.e., syndrome values that identify multi-bit errors in the data word being read). Each new syndrome value is simply added to one of the columns of the decode table (in its appropriate row). To that end, to calculate syndrome values for multi-bit errors, step 604 applies the XOR function to two or more of the single bit error syndrome values calculated in steps 600 and 602. For example, to calculate a syndrome value indicating that bit 0 and bit one both are in error, step 604 applies an XOR function to the single bit error syndrome values of bits 0 and 1. To that end, using the values in the decode table, step 604 executes the following function:

h3901 XOR h6b02

This operation produces the resulting syndrome h5203, which is shown in column 2 of the decode table.

Illustrative embodiments, however, apply the XOR function in this manner to groups of four consecutive bits only. In particular, illustrative embodiments apply the XOR function in this manner to bits 0-3, 4-7, 8-11, 12-15, etc. . . . . For example, for bits 0-3, the process of the FIG. 6 calculates syndrome values for the 15 various combinations of 1, 2, 3, and 4 bit errors. Those combinations are as follows:

1-bit errors: (bit 0) or (bit 1) or (a bit 2) or (bit 3);
2-bit errors: (bits 0,1) or (bits 0,2) or (bits 0, 3) or (bits 1,2) or (bits 1,3) or (bits 2,3);
3-bit errors: (bits 0, 1, 2) or (bits 0, 1, 3) or (bits 1, 2, 3) or (bits 0, 2, 3);
4-bit error: (bits 0, 1, 2, 3)

Step 604 continues by repeating this process for each set of four bits. As noted above, each derived syndrome value is added to the appropriate row of the decode table. Accordingly, as an example, the syndrome value derived for 3-bit errors of bits 0, 1, and 2 are added to rows 0, 1, and 2 of the decode table. Moreover, as long as the first column syndrome values are maintained, the specific column to which the multi-bit error syndrome values are added is irrelevant.

Accordingly, rather than permitting system failures, illustrative embodiments can correct any combination of 1, 2, 3, or 4 bit errors of a single X4-type memory device. In addition, illustrative embodiments can detect up to 8 bit errors across two X4-type memory devices. This functionality is a significant improvement over systems using single bit error correction. Moreover, embodiments also using redundant mirror memory backup and retry algorithms further enhance computer system robustness. In fact, those skilled in the art can apply principles of illustrative embodiments to memory devices that are larger than those discussed above (i.e., larger than X4-type memory devices). For example, illustrative embodiments can achieve X8 error correction by interleaving two 128+16 bit groups across X8 memory devices. In such embodiments, memory access could be 288 bit access (i.e., 4*72) bits.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

As suggested above, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of managing X4 or larger types of memory, the method comprising:
   receiving a data word to be stored in the memory;
   producing a set of encode data;
   generating a 16-bit check datum as a function of the data word to be stored and the encode data;
   storing the data word in the memory;
   using the check datum and the data word in the memory to generate a 16-bit syndrome;
   determining if the data word in the memory is correct as a function of the syndrome; and
   if the data word in the memory is not correct as a function of the syndrome, correcting between two and eight non-adjacent bits in the data word.

2. The method as defined by claim 1 further including storing the check datum in memory.

3. The method as defined by claim 1 wherein generating a check datum includes applying a function to selected bits of the data word, the selected bits being selected as determined by the set of encode data.

4. The method as defined by claim 1 wherein using the check datum includes:
   appending the check datum with the data word to produce revised data; and
   applying a logical function to selected bits of the revised data to produce the syndrome, the selected bits being selected as determined by the set of encode data to produce the syndrome.

5. The method as defined by claim 1 wherein determining if the data word in the memory is correct includes:
   comparing the syndrome to a set of error identity data; and
   determining that the data word in the memory is not correct if the syndrome matches at least one datum in the set of error identity data.

6. The method as defined by claim 5 wherein the set of error identity data is generated from the set of encode data, the set of error identity data including a plurality of values assigned to each bit of the data word, the error of a given bit being corrected if the syndrome matches at least one of the plurality of values assigned to the given bit.

7. The method as defined by claim 1 wherein the set of encode data includes a table identifying bits of the data word to be processed.

8. The method as defined by claim 1 further comprising:
   determining that a given bit of the data word has an error; and
   re-reading the given bit to determine if the error has been corrected.

9. The method as defined by claim 8 further comprising:
   storing the data word in a mirror memory location; and
   if the given bit is determined to have the error after it is re-read, then retrieving the correct data for the given bit from the mirror memory location and storing that corrected data in the given bit.

10. The method as defined by claim 8 further including correcting other bit errors in the data word if the given bit is corrected.

11. A computer program product for use on a computer system for managing X4 or larger types of memory, the computer program product comprising a tangible computer usable medium having computer readable program code thereon, the computer readable program code comprising:
   program code for receiving a data word to be stored in the memory;
   program code for producing a set of encode data;
   program code for generating a 16-bit check datum as a function of the data word to be stored and the encode data;
   program code for storing the data word in the memory;
   program code for using the check datum and the data word in the memory to generate a 16-bit syndrome;
   program code for determining if the data word in the memory is correct as a function of the syndrome; and
   program code for correcting between two and eight non-adjacent bits in the data word if the data word in the memory is not correct as a function of the syndrome.

12. The computer program product as defined by claim 11 further including program code for storing the check datum in memory.

13. The computer program product as defined by claim 11 wherein the program code for generating a check datum includes program code for applying a function to selected bits of the data word, the selected bits being selected as determined by the set of encode data.

14. The computer program product as defined by claim 11 wherein the program code for using the check datum includes:

program code for appending the check datum with the data word to produce revised data; and program code for applying a logical function to selected bits of the revised data to produce the syndrome, the selected bits being selected as determined by the set of encode data to produce the syndrome.

15. The computer program product as defined by claim 11 wherein the program code for determining if the data word in memory is correct includes:

program code for comparing the syndrome to a set of error identity data; and program code for determining that the data word in the memory is not correct if the syndrome matches at least one datum in the set of error identity data.

16. The computer program product as defined by claim 15 wherein the set of error identity data is generated from the set of encode data, the set of error identity data including a plurality of values assigned to each bit of the data word, the error of a given bit being corrected if the syndrome matches at least one of the plurality of values assigned to the given bit.

17. The computer program product as defined by claim 11 wherein the set of encode data includes a table identifying bits of the data word to be processed.

18. The computer program product as defined by claim 11 further comprising:

program code for determining that a given bit of the data word has an error; and program code for re-reading the given bit to determine if the error has been corrected.

19. The computer program product as defined by claim 18 further comprising:

program code for storing the data word in a mirror memory location; and program code for retrieving the correct data for the given bit from the mirror memory location and storing that corrected data in the given bit.

20. The computer program product as defined by claim 18 further including program code for correcting other bit errors in the data word if the given bit is corrected.

21. An apparatus for managing X4 or larger types of memory, the apparatus comprising:

an input for receiving a data word to be stored in the memory;

an encoder operatively coupled with the input, the encoder generating a 16-bit check datum as a function of the data word to be stored and a set of encode data;

a data handler operatively coupled with the memory, the data handler storing the data word in the memory;

a decoder that uses the check datum and the data word in the memory to generate a 16-bit syndrome; and an error module for determining if the data word in the memory is correct as a function of the syndrome and correction between two and eight non-adjacent bits in the data word.

22. The apparatus as defined by claim 21 wherein the encoder is configured to apply a function to selected bits of the data word, the selected bits being selected as determined by the set of encode data.

23. The apparatus as defined by claim 21 wherein the error module includes:

a comparator for comparing the syndrome to a set of error identity data; and a corrector for correcting the error if the syndrome matches at least one datum in the set of error identity data, the corrector being configured to correct between one and four bits of data.

24. The apparatus as defined by claim 23 wherein the set of error identity data is generated from the set of encode data, the set of error identity data including a plurality of values assigned to each bit of the data word, the error of a given bit being corrected if the syndrome matches at least one of the plurality of values assigned to the given bit.

25. The apparatus as defined by claim 21 wherein if the error module determines that a given bit of the data word has an error, then it re-reads the given bit to determine if the error has been corrected.

26. The apparatus as defined by claim 25 wherein the data word is stored in a mirror memory location, and if the given bit is determined to have the error after it is re-read, then the error module is configured to retrieve the correct data for the given bit from the mirror memory location and store that corrected data in the given bit.

27. The apparatus as defined by claim 25 wherein the error module is configured to correct other bit errors in the data word if the given bit is corrected.

* * * * *